(12) United States Patent
Murray et al.

(10) Patent No.: US 12,440,644 B2
(45) Date of Patent: Oct. 14, 2025

(54) REUSABLE URINARY CATHETER PRODUCTS

(71) Applicant: Hollister Incorporated, Libertyville, IL (US)

(72) Inventors: Michael G. Murray, Ballina (IE); Horacio Montes de Oca, Ballina (IE); Malford E. Cullum, Grayslake, IL (US); Gary W. Inglese, Deerfield, IL (US); Rory Grogan, Dublin (IE)

(73) Assignee: Hollister Incorporated, Libertyville, IL (US)

( * ) Notice: Subject to any disclaimer, the term of this patent is extended or adjusted under 35 U.S.C. 154(b) by 838 days.

(21) Appl. No.: 17/617,822

(22) PCT Filed: Jun. 23, 2020

(86) PCT No.: PCT/US2020/039190
§ 371 (c)(1),
(2) Date: Dec. 9, 2021

(87) PCT Pub. No.: WO2020/263859
PCT Pub. Date: Dec. 30, 2020

(65) Prior Publication Data
US 2022/0226605 A1     Jul. 21, 2022

Related U.S. Application Data

(60) Provisional application No. 62/866,339, filed on Jun. 25, 2019.

(51) Int. Cl.
*A61M 25/00*     (2006.01)
*A61L 2/18*     (2006.01)

(52) U.S. Cl.
CPC ............ *A61M 25/002* (2013.01); *A61L 2/18* (2013.01); *A61M 25/0045* (2013.01);
(Continued)

(58) Field of Classification Search
CPC ...... A61L 2/18; A61L 2/238; A61L 2202/122; A61L 2202/18; A61L 2202/24;
(Continued)

(56) References Cited

U.S. PATENT DOCUMENTS 1,120,549 A    12/1914   Schellberg
3,794,042 A    2/1974   De Klotz et al.
(Continued)

FOREIGN PATENT DOCUMENTS

EP     0751796 A1    1/1997
EP     0887373 A2    12/1998
(Continued)

OTHER PUBLICATIONS

International Search Report and Written Opinion Dated Nov. 2, 2020 for International Application No. PCT/US2020/039190.

*Primary Examiner* — Timothy C Cleveland
(74) *Attorney, Agent, or Firm* — Cook Alex Ltd.

(57) ABSTRACT

Reusable catheter products (10) are provided for storing, transporting, and sterilizing reusable urinary catheters. The products include a case (12) comprising a proximal section (30), a middle section (40), and a distal section (32). The case includes a cavity (16) configured to receive a catheter (14); the cavity includes a hydration fluid (18). The catheter comprises a distal end, a proximal end and a tubular section therebetween and includes a hydrophilic coating. When the catheter is inserted into the case, the hydration fluid sterilizes and lubricates the catheter.

5 Claims, 2 Drawing Sheets

(52) U.S. Cl.
CPC ..... *A61L 2202/122* (2013.01); *A61L 2202/18* (2013.01); *A61L 2202/24* (2013.01); *A61M 2025/0019* (2013.01); *A61M 2025/0046* (2013.01); *A61M 2025/0056* (2013.01)

(58) Field of Classification Search
CPC ............ A61M 25/0019; A61M 25/002; A61M 25/0045; A61M 25/0046; A61M 25/0056
See application file for complete search history.

(56) References Cited

U.S. PATENT DOCUMENTS

| | | | |
|---|---|---|---|
| 4,170,996 A | 10/1979 | Wu | |
| 4,346,706 A | 8/1982 | Leveen | |
| 4,754,877 A | 7/1988 | Johansson et al. | |
| 5,120,322 A | 6/1992 | Davis | |
| 5,207,705 A | 5/1993 | Trudell | |
| 5,226,530 A | 7/1993 | Golden | |
| 5,292,802 A | 3/1994 | Rhee | |
| 5,369,131 A | 11/1994 | Poli | |
| 5,451,406 A | 9/1995 | Lawin | |
| 5,718,862 A | 2/1998 | Thompson | |
| 5,800,412 A | 9/1998 | Zhang | |
| 6,113,629 A | 9/2000 | Ken | |
| 6,129,956 A | 10/2000 | Morra | |
| 6,352,710 B2 | 3/2002 | Sawhney | |
| 6,387,080 B1 | 5/2002 | Rødsten | |
| 6,409,723 B1 | 6/2002 | Edwards | |
| 6,419,673 B1 | 7/2002 | Edwards | |
| 6,524,608 B2 | 2/2003 | Ottoboni | |
| 6,535,768 B1 | 3/2003 | Baker | |
| 6,548,487 B2 | 4/2003 | Takahashi | |
| 6,607,525 B2 | 8/2003 | Franco | |
| 6,695,831 B1 | 2/2004 | Tsukada et al. | |
| 7,014,861 B2 | 3/2006 | Roorda | |
| 7,125,858 B2 | 10/2006 | Filion | |
| 7,235,107 B2 | 6/2007 | Evans | |
| 7,390,525 B2 | 6/2008 | Epstein | |
| 7,537,589 B2 | 5/2009 | Tsukada et al. | |
| 7,767,652 B2 | 8/2010 | Hendriks | |
| 7,857,804 B2 | 12/2010 | McCaffrey | |
| 7,862,552 B2 | 1/2011 | McIntyre | |
| 7,918,819 B2 | 4/2011 | Karmarkar | |
| 7,976,847 B2 | 7/2011 | Southard | |
| 8,158,187 B2 | 4/2012 | Chen | |
| 8,163,326 B2 | 4/2012 | Zhong | |
| 8,235,937 B2 | 8/2012 | Palasis | |
| 8,252,738 B2 | 8/2012 | Marx | |
| 8,267,919 B2 | 9/2012 | Utas | |
| 8,461,104 B2 | 6/2013 | Bengmark | |
| 8,580,551 B2 | 11/2013 | Kaplan | |
| 8,585,753 B2 | 11/2013 | Scanlon | |
| 8,617,542 B2 | 12/2013 | Madhyastha | |
| 8,646,445 B2 | 2/2014 | Fine | |
| 8,680,228 B2 | 3/2014 | Guo | |
| 8,685,427 B2 | 4/2014 | Li | |
| 8,703,180 B1 | 4/2014 | Stankus | |
| 8,709,465 B2 | 4/2014 | Chen | |
| 8,889,211 B2 | 11/2014 | Owens | |
| 8,911,424 B2 | 12/2014 | Weadock | |
| 8,916,227 B2 | 12/2014 | Horres | |
| 8,933,416 B2 | 1/2015 | Arcand et al. | |
| 9,132,151 B2 | 9/2015 | Ko | |
| 9,226,926 B2 | 1/2016 | Ueda | |
| 9,295,663 B2 | 3/2016 | Pacetti | |
| 9,364,513 B2 | 6/2016 | Ellis-Behnke | |
| 9,415,084 B2 | 8/2016 | Ellis-Behnke | |
| 9,724,448 B2 | 8/2017 | Kobayashi | |
| 9,884,028 B2 | 2/2018 | Holzer | |
| 10,076,537 B2 | 9/2018 | Marcum | |
| 10,137,287 B2 | 11/2018 | Sansone | |
| 10,172,978 B2 | 1/2019 | Wedlin | |
| 10,227,718 B2 | 3/2019 | Cahil | |
| 10,232,143 B2 | 3/2019 | Rajagopalan | |
| 10,525,172 B2 | 1/2020 | Martin | |
| 10,532,132 B2 | 1/2020 | Tobias | |
| 10,537,375 B2 | 1/2020 | Wang | |
| 10,583,237 B2 | 3/2020 | Feld | |
| 10,639,400 B2 | 5/2020 | Sartor | |
| 10,695,461 B2 | 6/2020 | Suppiger | |
| 10,791,735 B2 | 10/2020 | Thomas | |
| 10,806,830 B2 | 10/2020 | Wang | |
| 10,829,520 B2 | 11/2020 | Obrecht | |
| 10,849,324 B2 | 12/2020 | Sawyer | |
| 10,987,208 B2 | 4/2021 | Schaefer | |
| 11,001,612 B2 | 5/2021 | Zlotkin | |
| 11,001,688 B2 | 5/2021 | Niu | |
| 11,098,203 B2 | 8/2021 | Ozcelik | |
| 11,541,205 B2 | 1/2023 | Erbey | |
| 2002/0058631 A1 | 5/2002 | Cai | |
| 2003/0017073 A1 | 1/2003 | Eckhardt et al. | |
| 2003/0130228 A1 | 7/2003 | Chen | |
| 2003/0181388 A1 | 9/2003 | Cai | |
| 2003/0191064 A1 | 10/2003 | Kopke | |
| 2004/0005423 A1 | 1/2004 | Dalton | |
| 2004/0047892 A1 | 3/2004 | DesRosiers | |
| 2004/0049134 A1 | 3/2004 | Tosaya | |
| 2004/0092821 A1 | 5/2004 | Hering | |
| 2004/0151702 A1 | 8/2004 | Marksteiner | |
| 2004/0197784 A1 | 10/2004 | Miano | |
| 2004/0215231 A1 | 10/2004 | Fortune | |
| 2005/0003010 A1 | 1/2005 | Cohen | |
| 2005/0013812 A1 | 1/2005 | Dow | |
| 2005/0033374 A1 | 2/2005 | Gerber | |
| 2005/0163818 A1 | 7/2005 | Sung | |
| 2006/0093644 A1 | 5/2006 | Quelle | |
| 2006/0134186 A1 | 6/2006 | Carlton | |
| 2007/0066963 A1 | 3/2007 | Tanghoj | |
| 2007/0239107 A1 | 10/2007 | Lundberg | |
| 2008/0091145 A1 | 4/2008 | House | |
| 2008/0103481 A1 | 5/2008 | Vogel | |
| 2008/0177217 A1 | 7/2008 | Polaschegg | |
| 2008/0200907 A1 | 8/2008 | Nestenborg | |
| 2008/0200924 A1 | 8/2008 | Burbank | |
| 2008/0242614 A1 | 10/2008 | Fraser | |
| 2008/0275015 A1 | 11/2008 | Potter | |
| 2008/0311172 A1 | 12/2008 | Schapira | |
| 2009/0071851 A1 | 3/2009 | Maki et al. | |
| 2009/0098187 A1 | 4/2009 | Peters | |
| 2009/0101531 A1 | 4/2009 | Nordholm et al. | |
| 2009/0171317 A1 | 7/2009 | Versi | |
| 2009/0227981 A1 | 9/2009 | Bennett | |
| 2009/0299334 A1 | 12/2009 | Nishtala et al. | |
| 2010/0198195 A1 | 8/2010 | Nishtala | |
| 2010/0331819 A1 | 12/2010 | Hossainy | |
| 2011/0091515 A1 | 4/2011 | Zilberman | |
| 2011/0114520 A1 | 5/2011 | Matthison-Hansen | |
| 2011/0137296 A1 | 6/2011 | Tanghoj | |
| 2011/0142901 A1 | 6/2011 | Brandon | |
| 2012/0168324 A1 | 7/2012 | Carleo | |
| 2012/0179145 A1 | 7/2012 | Nishtala | |
| 2012/0245518 A1 | 9/2012 | Lovasz | |
| 2012/0316515 A1 | 12/2012 | Terry | |
| 2013/0060188 A1* | 3/2013 | Bedwell | A61L 29/106 604/21 |
| 2014/0236082 A1 | 8/2014 | Roorda | |
| 2015/0065998 A1* | 3/2015 | Nielsen | A61M 25/0045 604/523 |
| 2015/0367029 A1 | 12/2015 | DeVore | |
| 2016/0331841 A1 | 11/2016 | Prestwich | |
| 2017/0065519 A1 | 3/2017 | Zilberman | |
| 2017/0106120 A1 | 4/2017 | McClendon | |
| 2017/0136127 A1 | 5/2017 | Maki | |
| 2017/0165194 A1 | 6/2017 | Meng | |
| 2018/0071482 A1 | 3/2018 | Fitzpatrick | |
| 2018/0207323 A1 | 7/2018 | Chen | |
| 2018/0236141 A1 | 8/2018 | Russell | |
| 2019/0015625 A1* | 1/2019 | Neethling | A61B 50/33 |
| 2019/0030184 A1 | 1/2019 | Kidambi | |
| 2019/0046488 A1 | 2/2019 | Rosenblatt | |
| 2019/0175104 A1 | 6/2019 | Malik | |
| 2019/0262500 A1 | 8/2019 | Xu | |
| 2019/0269816 A1 | 9/2019 | Williams | |
| 2019/0375149 A1 | 12/2019 | Limem | |

(56) References Cited

U.S. PATENT DOCUMENTS

| | | |
|---|---|---|
| 2020/0009214 A1 | 1/2020 | Gil |
| 2020/0056063 A1 | 2/2020 | Wilson |
| 2020/0190511 A1 | 6/2020 | Olson |
| 2020/0197562 A1 | 6/2020 | Xue |
| 2020/0368159 A1 | 11/2020 | Chen |
| 2020/0392465 A1 | 12/2020 | Sanghavi |
| 2021/0015993 A1 | 1/2021 | O'Neill |
| 2021/0145749 A1 | 5/2021 | Tagil |
| 2022/0016398 A1 | 1/2022 | Li |
| 2022/0233437 A1 | 7/2022 | Borody |
| 2022/0257843 A1 | 8/2022 | Testani |
| 2022/0273587 A1 | 9/2022 | Parsons |
| 2022/0273698 A1 | 9/2022 | Lovasz |
| 2022/0280682 A1 | 9/2022 | Bodkhe |
| 2022/0370688 A1 | 11/2022 | Sileika |

FOREIGN PATENT DOCUMENTS

| | | |
|---|---|---|
| EP | 1087795 A1 | 4/2001 |
| EP | 1181023 B1 | 2/2002 |
| EP | 1060204 B1 | 6/2002 |
| EP | 1214039 A2 | 6/2002 |
| EP | 1070502 B1 | 6/2003 |
| EP | 1324785 B1 | 4/2004 |
| EP | 1589888 A2 | 11/2005 |
| EP | 1272227 B1 | 4/2006 |
| EP | 1264613 B1 | 2/2007 |
| EP | 1682124 B1 | 12/2007 |
| EP | 1476204 B1 | 10/2008 |
| EP | 1433485 B1 | 11/2009 |
| EP | 2259788 A2 | 12/2010 |
| EP | 2379059 A1 | 10/2011 |
| EP | 2402043 A1 | 1/2012 |
| EP | 2411440 B1 | 2/2012 |
| EP | 2788040 B1 | 10/2014 |
| EP | 2823845 A1 | 1/2015 |
| EP | 2231254 B9 | 4/2015 |
| EP | 2860194 B1 | 4/2015 |
| EP | 2911735 B1 | 9/2015 |
| EP | 2793962 B1 | 4/2016 |
| EP | 1912627 B1 | 8/2016 |
| EP | 3065807 A1 | 9/2016 |
| EP | 3119447 A1 | 1/2017 |
| EP | 3148334 A1 | 4/2017 |
| EP | 3234000 A1 | 10/2017 |
| EP | 3242657 A1 | 11/2017 |
| EP | 2437844 B1 | 5/2018 |
| EP | 2919846 B1 | 4/2019 |
| EP | 3419597 B1 | 12/2019 |
| EP | 2776079 B1 | 4/2020 |
| EP | 3057617 B1 | 4/2020 |
| EP | 3706816 A1 | 9/2020 |
| EP | 3052111 B1 | 12/2020 |
| EP | 3746112 A1 | 12/2020 |
| EP | 3750523 A1 | 12/2020 |
| EP | 3750524 A1 | 12/2020 |
| EP | 3791865 A1 | 3/2021 |
| EP | 3810085 A1 | 4/2021 |
| EP | 3810094 A1 | 4/2021 |
| EP | 3810095 A1 | 4/2021 |
| EP | 3810268 A1 | 4/2021 |
| EP | 3917584 A1 | 12/2021 |
| EP | 3924031 A1 | 12/2021 |
| EP | 3937994 A1 | 1/2022 |
| EP | 3941542 B1 | 1/2022 |
| EP | 3974007 A1 | 3/2022 |
| EP | 4031131 A1 | 7/2022 |
| EP | 4045054 A1 | 8/2022 |
| EP | 4048229 A1 | 8/2022 |
| EP | 4048298 A1 | 8/2022 |
| EP | 4087558 A1 | 11/2022 |
| WO | 1989003232 A1 | 4/1989 |
| WO | 2002020005 A1 | 3/2002 |
| WO | 2002024248 A1 | 3/2002 |
| WO | 2004030706 A2 | 4/2004 |
| WO | 2004066875 A1 | 8/2004 |
| WO | 2005018600 A2 | 3/2005 |
| WO | 2005058200 A1 | 6/2005 |
| WO | 2005092419 A1 | 10/2005 |
| WO | 2006002365 A2 | 1/2006 |
| WO | 2012034032 A2 | 3/2012 |
| WO | 2013049033 A1 | 4/2013 |
| WO | 2014139809 A1 | 9/2014 |
| WO | 2015074730 A1 | 5/2015 |
| WO | 2015075841 A1 | 5/2015 |
| WO | 2015184365 A1 | 12/2015 |
| WO | 2016159859 A1 | 10/2016 |
| WO | 2018053111 A1 | 3/2018 |
| WO | 2018153514 A1 | 8/2018 |
| WO | 2019104213 A1 | 5/2019 |
| WO | 2021089470 A1 | 5/2021 |
| WO | 2021168284 A1 | 8/2021 |
| WO | 2022055559 A1 | 3/2022 |

* cited by examiner

REUSABLE URINARY CATHETER PRODUCTS

The present application is a National Stage Entry of International Application No. PCT/US2020/039190, filed Jun. 23, 2020, which claims the benefit of and priority to U.S. Provisional Application No. 62/866,339, filed Jun. 25, 2019, all of which are hereby incorporated herein by reference.

FIELD OF THE DISCLOSURE

The present disclosure generally relates to urinary catheters. More particularly, the present disclosure relates to reusable urinary catheter products.

BACKGROUND

Catheters are used to treat many different types of medical conditions and typically include an elongated shaft that is inserted into and through a passageway or lumen of the body. Catheters, and in particular intermittent catheters, are commonly used by those who suffer from various abnormalities of the urinary system, such as urinary incontinence. With the advent of intermittent catheters, individuals with urinary system abnormalities can self-insert and self-remove intermittent catheters several times a day.

Urinary catheters are frequently provided as disposable, single-use items. A user will remove the catheter from a package, use the catheter once, and then dispose of the catheter and the package. Reusable urinary catheters could, thus, be advantageous in reducing the amount of waste created by the use of disposable catheters, but there are various challenges associated with the use of reusable catheters (including storage, transport, and sterilization) that must be overcome before widespread acceptance and use of reusable catheters.

There is a need for reusable catheter products and methods of sterilizing the same.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, the reusable catheter product includes a catheter and a case. The case includes a distal section, a proximal section, and a middle section therebetween. The case also includes a cavity configured to receive the catheter. The reusable catheter includes a distal end and a proximal end. The reusable catheter includes a hydrophilic coating. The case also includes a hydration fluid contained within the cavity. The hydration fluid includes a sterilization medium. The product allows the catheter to be repeatedly inserted and removed from the case, and yields a sterile and re-usable catheter.

In another aspect, the reusable catheter product further includes the case having a flexible middle section, and rigid proximal and distal sections. The flexible middle section may have grooves and/or ridges. The case may also include at least one grip, and the distal section of the case may define at least one cutout configured to mate with a catheter cap. Moreover, the catheter further includes the catheter cap configured to mate with the cutout.

In another aspect, a method for sterilizing the reusable catheter product is disclosed. The method includes inserting the hydration fluid comprising the sterilization medium into the cavity and inserting the catheter into the case by pushing the proximal end of the catheter into the proximal section of the case.

DESCRIPTION

The embodiments disclosed herein are for the purpose of providing a description of the present subject matter, and it is understood that the subject matter may be embodied in various other forms and combinations not shown in detail. Therefore, specific embodiments and features disclosed herein are not to be interpreted as limiting the subject matter as defined in the accompanying claims.

Figure 1:
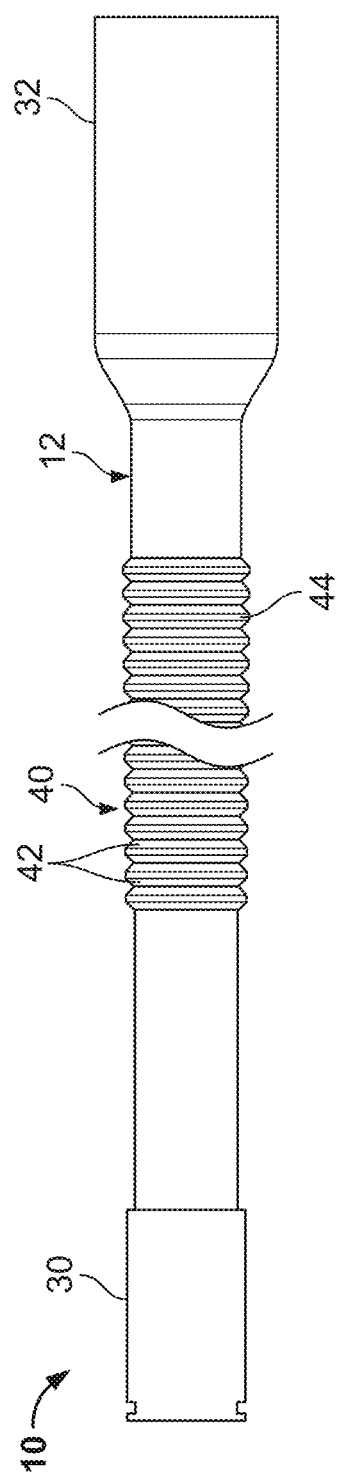
FIG. 1 is a side view of a reusable catheter product.

Reusable urinary catheter products according to the present disclosure and their individual components may be variously configured without departing from the scope of the present disclosure, but in one embodiment, a reusable urinary catheter product 10 is configured as shown in FIG. 1.

Figure 2:
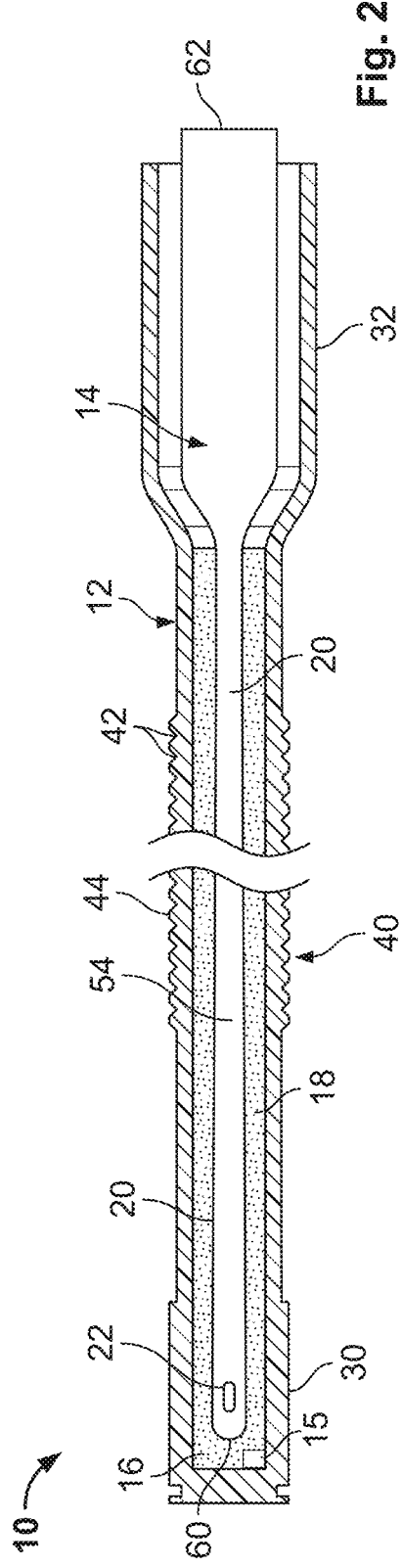
FIG. 2 is a cross-sectional view of the reusable catheter product of FIG. 1, showing a catheter positioned in a case.
Figure 3:
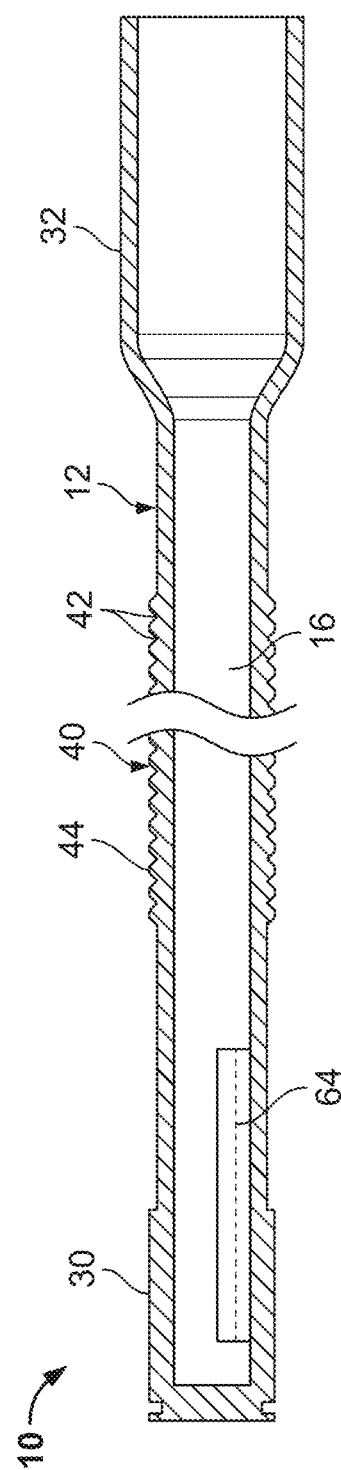
FIG. 3 is a cross-sectional view of the reusable catheter product of FIG. 1, showing the case without the catheter.

FIG. 1 shows a reusable urinary catheter product 10. The product 10 includes a storage and sterilization device, such as a case 12. Referring to FIGS. 2 and 3, the case 12 defines a cavity 16 configured to hold a hydration fluid 18. The case 12 includes a proximal section 30, a distal section 32, and a middle section 40 therebetween. The middle section 40 may be bendable or flexible. In the illustrated embodiment the middle section 40 includes grooves 42 and ridges 44 that assist in allowing the middle section 40 to bend. In one embodiment, the proximal section 30 and the distal section 32 are both comprised of rigid materials. The materials include but are not limited to PVC plastics and high density polyethylene (HDPE). Optionally, the middle section 40 comprises flexible material, including but not limited to elastomers.

The case 12 is configured to accommodate a multiuse urinary catheter 14. In an embodiment, the cavity 16 is configured to accept and store the urinary catheter 14. The catheter 14 includes a shaft 20 which has a hydrophilic coating thereon. The hydrophilic coating becomes lubricous when hydrated with a hydration fluid, which assists in easing insertion and withdrawal of the catheter 14 from the urethra.

The hydration fluid 18 comprises a sterilization medium for sterilizing the catheter 14 in between uses. The sterilization medium in the hydration fluid 18 contacts the catheter 14, when the catheter 14 is located within the cavity 16. The sterilization medium in the hydration fluid 18 can include any suitable antiseptic component such as iodine, oligodynamic metals, etc. In one embodiment, the hydration fluid 18 may include a water-based solution of a complex of polyvinyl pyrrolidone (PVP) and iodine. The hydration fluid 18 is capable of activating or refreshing the hydrophilic coating of the urinary catheter 14, and capable of sterilizing the catheter 14 when the coating contacts the hydration fluid 18. In one embodiment, when a user inserts the catheter 14 into the case 12, the catheter 14 may be immersed in the hydration fluid 18, which sterilizes and hydrates the hydrophilic coating of the catheter 14. In another embodiment, the catheter 14 may not be immersed in the hydration fluid 18 but the fluid 18 may slosh around within the case 12 due to shaking and/or natural movement of the user.

In an embodiment, the hydration fluid 18 comprises a water based solution of chlorhexidine (e.g., dihydrochloride, diacetate, and digluconate).

In another embodiment the sterilization medium of the hydration fluid 18 comprises FimH inhibitors that hinder bacterial adhesion to cells, tissues and synthetic material surfaces, thus preventing bacterial colonization and proliferation. The FimH inhibitors include, but are not limited to, mannose based molecules. Among these mannose based molecules are alkyl alfa-D-mannopyranosides (e.g. heptyl alfa-D-mannopyranoside) and aryl alfa-D-mannopyranosides, having different degrees of relative inhibitory potency. In an embodiment, the sterilization medium of the hydration fluid 18 includes antibacterial materials. These antibacterial materials include peptidomimetic antimicrobials (synthetic peptides that attack the prokaryotic membrane and destroy it). Examples of these are: Lys-Leu or klotho (KL) peptide known as (KLAKLAK)2, D-(KLAKLAK)2, brilacidin (PMX-30063) and POL7080.

In one embodiment the sterilization medium of the hydration fluid 18 comprises antibacterial materials including aminoglycosides and derivatives (bactericidal antibiotics tolerant to enzymatic inactivation). Examples of these include but are not limited to Plazomicin.

In another embodiment the sterilization medium of the hydration fluid 18 comprises nanoparticles with bactericidal effects. Examples of these include, but are not limited to, zinc oxide and copper oxide.

In another embodiment the sterilization medium of the hydration fluid 18 comprises oxazolidinones capable of inhibiting bacterial protein synthesis. These oxazolidinones include, but are not limited to, Tedizolid, Solithromycin, cethromycin, Omadacycline, fusidic acid, GSK1322322, Radezolid, Tedizolid S and Eravacycline.

In another embodiment the sterilization medium of the hydration fluid 18 comprises antibacterial proteins that inactivate bacterial DNA. These anti-bacterial proteins include, but are not limited to, SASPject technology. In another embodiment the sterilization medium of the hydration fluid 18 comprises a water solution with honey. In one embodiment the sterilization medium of the hydration fluid 18 comprises glucose oxidase.

In addition to the hydration fluid 18 having features which may sterilize the product 10, the catheter 14 and/or case 12 may also have features that facilitate sterilization. For example, an antimicrobial compound may be incorporated into the material of the catheter 14 and/or case 12. The antimicrobial compound may include, but is not limited to, zinc oxide, zinc sulphates, and zero valence silver.

In one embodiment zinc oxide is incorporated into the material of the catheter 14 and/or case 12. For instance, zinc oxide (ZnO) powder may be compounded using a twin screw extruder with the polymer material of the case, which may be a thermoplastic elastomer (TPE). This ZnO compound is then extruded to produce a case 12 and/or catheter 14 loaded with antimicrobial ZnO.

In one embodiment, when making the catheter 14, a polymer loaded with ZnO is formed into a catheter tube. The tube is tipped and a funnel is attached to the catheter 14. The catheter 14 is subsequently coated with a hydrophilic coating such as a polyvinylpyrrolidone (PVP) based coating. Once the catheter 14 is coated, at least one catheter "eye" 22 is cut into the tube (FIG. 2). Thus, the catheter 14 has an outer portion with a hydrophilic coating and an inner portion including a polymer-ZnO composite. Due to the antibacterial properties of the ZnO-polymer composite the inner surface will resist bacterial colonization. Similarly, the case 12 may be made from a loaded polymer, such as TPE, which inhibits bacterial colonization in the cavity 16 of the case 12. Furthermore, the outer surface of the catheter 14 and the inner surface of the case 12 may be UV irradiated to kill bacteria.

In another embodiment the hydrophilic coating of the catheter 14 is loaded with ZnO to provide an antibacterial hydrophilic surface. Alternatively, the catheter 14 and/or coating, comprises zinc sulphates (ZnSO4) and zero valence silver.

In another embodiment, the catheter 14 includes a silicone based coude tip/straight tip. The catheter 14 also may include zero valence silver attached to its exterior and interior walls. When metallic silver is deposited inside and outside of the catheter 14, the catheter 14 may remain bacteria free and be useable for a years-long time period.

In one embodiment, the case 12 includes a wall that is lined with silver and the case12 is filled with water. The silver lining helps kill bacteria both inside and outside the catheter 14.

In one embodiment, the case 12 includes a pouch that is lined with silver. The pouch is filled with water and is configured to hold the catheter 14. The silver lining helps kill bacteria both inside and outside of the catheter 14.

In one embodiment the hydration fluid 18 may include water containing a surfactant to loosen biofilm from the catheter 14.

In one embodiment the case 12 includes an agitator 15 to agitate the hydration fluid 18 during sterilization of the catheter 14.

In one embodiment the catheter 14 is placed in a catheter pack capable of irradiating the catheter with antibacterial UV light 64 for sterilization (illustrated in FIG. 3). Optionally, the hydration fluid 18 may include a hydrophilic polymer, such as PVP. When the hydration fluid 18 contacts the hydrophilic coating, the hydrophilic polymer also contacts the coating. During exposure to UV light, the hydrophilic polymer of the hydration fluid 18 crosslinks with the hydrophilic coating so as to refresh the hydrophilic coating with additional polymer chains.

FIG. 2 is a cross sectional view of an embodiment of the product 10, showing the catheter 14 inside the case 12. As shown in FIG. 2, the case 12 is configured to accommodate the catheter 14. When a user inserts the catheter 14 inside the case 12, the hydration fluid 18 inside the case 12 sterilizes the catheter 14, allowing for multiple safe and sterile uses of the catheter 14. Moreover, the catheter eye 22 is visible at the proximal end 60 of the catheter 14, near the proximal section 30 of the case 12. The catheter eye 22 is configured to receive the hydration fluid 18. The catheter eye 22 allows the hydration fluid 18 to travel inside the catheter 14 so that the hydration fluid 18 sterilizes the inside of the catheter 14.

FIGS. 2 and 3 show the case 12 in a straightened configuration. The straightened configuration allows the catheter 14 to be fully inserted into the case 12. When in the straightened configuration, the flexible middle section 40 is planar and aligned with both the proximal section 30 and the distal section 32 of the case 12. Optionally, the case 12 may include a UV light 64 that may be used to sterilize the product 10 and refresh the hydrophilic coating when the hydration fluid 18 includes a hydrophilic polymer.

Figure 4:
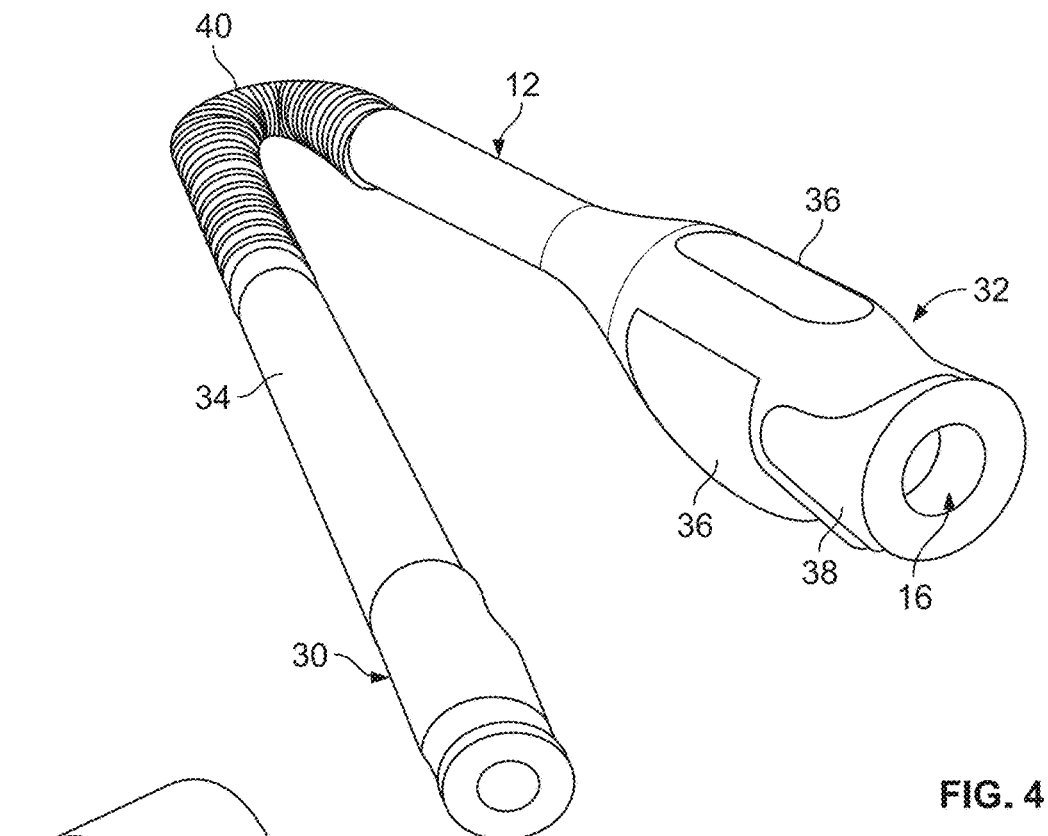
FIG. 4 is a perspective view of the reusable catheter product of FIG. 1, showing the case in a bent configuration.

FIG. 4 shows an embodiment of the case 12 in a bent configuration. The bent configuration allows a user to more easily store and carry the case 12. In the bent configuration the middle section 40 is flexed so that the distal section 32 and the proximal section 30 sit approximately opposed to each other. In the embodiment shown, the middle section 40 is bent at an acute angle. However, the flexible material comprising the middle section 40 allows for a range of angles; a user may choose the angle he or she prefers for added convenience.

FIG. 4 also shows grips 34, 36 attached to the outside of the case 12. The case 12 includes a lower grip 34 that surrounds the lower portion of the case 12. The lower grip 34 comprises a smooth elastomeric material, such as rubber. In the embodiment shown in FIG. 4, the lower grip 34 extends from the bottom of the middle section 40 to approximately ⅔ of the way to the proximal section 30. FIG. 4 also shows an upper grip 36. The upper grip 36 shown in FIG. 4 comprises a partially grooved elastomeric material (for example, rubber) and/or plastic. The upper grip 36 at least partially surrounds the upper portion of the case 12. In FIG. 4 the upper grip 36 extends from the distal section 32 to approximately the halfway point between the distal section 32 and the top of the middle section 40. The grips 34, 36 make it easier for the user to grasp and hold the product 10.

Figure 5:
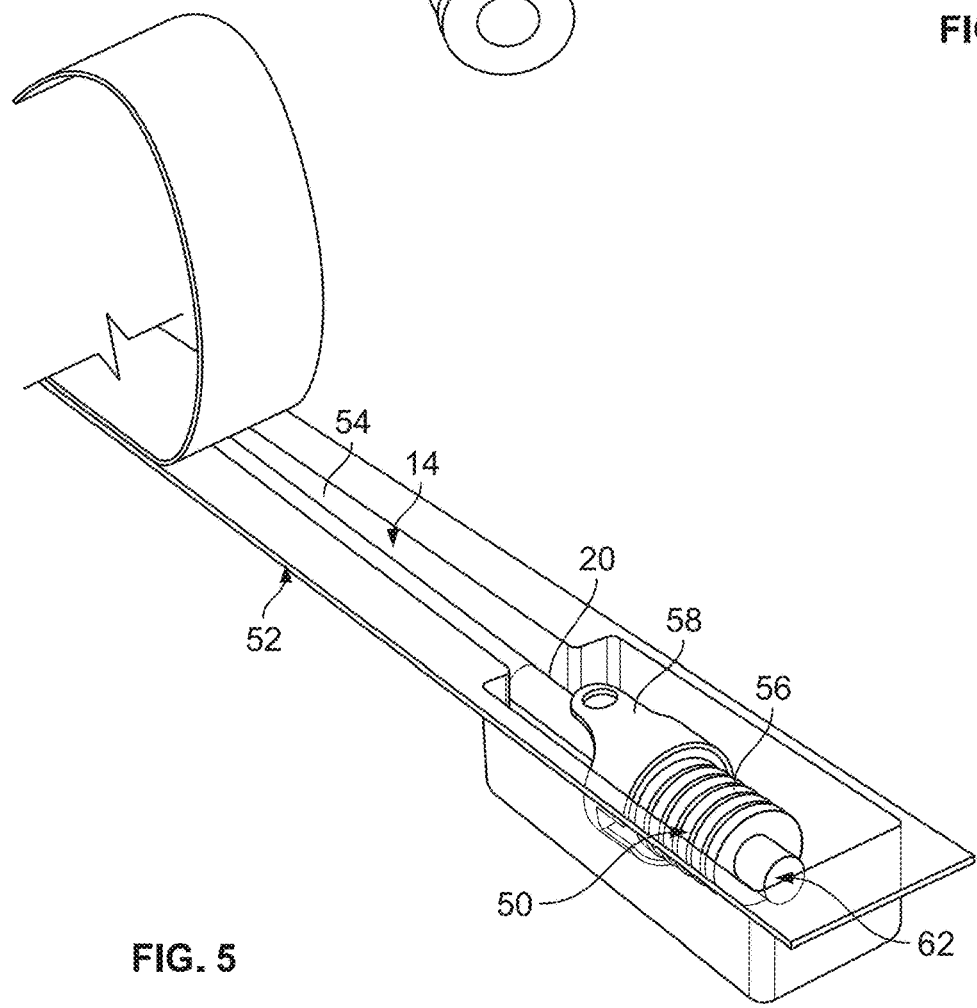
FIG. 5 is a perspective view of a multiuse catheter contained within a package.

Furthermore, the distal section 32 comprises a cutout 38 configured to accommodate a cap 50 on the distal end 62 of the catheter 14 (the cap is shown as 50 in FIG. 5). The cap 50 and the cutout 38 fit together to help keep the catheter 14 in place while inserted into the case 12. This cap 50 and cutout 38 coupling may help keep the catheter 14 stable for traveling, sterilization, and/or for when the case 12 is in the bent configuration with the catheter 14 inside.

Additionally, FIG. 4 shows an embodiment wherein the distal section 32 has a wider section at the upper most portion of the case 12 that tapers distally from the bottom of the upper grip 36. The wider section of the upper portion of the case 12 extends from the bottom of the cutout 38 to the bottom of the upper grip 36. The narrower section of the upper portion extends from the bottom of the upper grip 36 to the top of the middle section 40. The case 12, the cavity 16, and the tapered upper portion may be configured to accommodate the shape of the catheter 14.

Referring to FIG. 5, the catheter 14 may be provided to a user in a disposable package 52. The catheter 14 comprises a proximal end 60 and a distal end 62 with a tubular section 54 therebetween. The tubular section 54 may comprise a shaft 20. The reusable catheter 14 may be used multiple times and then may be discarded for a new catheter 14. The catheter 14 shown in FIG. 5 also comprises a removable cap 50 configured to mate with the cutout 38 (shown in FIG. 4). The cap 50 includes a lower section 58 configured to engage the cutout 38 on the case 12.

As shown in FIG. 5, the removable cap 50 surrounds the distal end 62 of the catheter 14 and comprises a substantially rigid polymeric material including but not limited to plastic. The cap 50 closes off the distal end 62 of the catheter 14 so that when it is stored in the case 12, hydration fluid 18 does not leak from the distal end 62 of the catheter 14. Moreover, the cap 50 shown includes a portion with at least one groove 56. The at least one groove 56 spans the circumference of the cap 50.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A reusable urinary catheter product comprising:
    a case comprising a distal section, a proximal section, and a flexible middle section therebetween, wherein the middle section of the case comprises grooves and ridges and is configured to bend, the case defining a cavity and the distal section of the case including at least one cutout on an outer surface of the case, and wherein one or more of zinc oxide, zinc sulphates, or zero valence silver is compounded into a material of the case;
    a hydration fluid within the cavity, the hydration fluid comprising a sterilization medium;
    a reusable catheter including a catheter shaft having a distal end and a proximal end, the catheter including a hydrophilic coating thereon, wherein the hydration fluid hydrates and sterilizes the catheter, the catheter being configured to be repeatedly inserted into and removed from the case; and
    a cap associated with distal end portion of the catheter shaft, wherein a lower section of the cap engages the at least one cutout of the case.

2. The product of claim 1 wherein the hydration fluid comprises at least one of: an anti-septic lubricant, a water-based solution of chlorhexidine, an oil-based lubricating agent, FimH inhibitors, antibacterial materials, nanoparticles with bactericidal effects, oxazolidinones, antibacterial proteins, a water solution with honey, glucose oxidase, a water solution with silver, a solution of polyvinyl pyrrolidone (PVP) and iodine, or a water lubricant with a surfactant configured to loosen a biofilm from the catheter.

3. The product of claim 1, wherein one or more of zinc oxide, zinc sulphates, or zero valence silver is incorporated into the the catheter.

4. The product of claim 2, wherein the FimH inhibitors include mannose based molecules comprising one or more of alkyl alfa-D-mannopyranosides, or aryl alfa-D-mannopyranosides.

5. The product of claim 2, wherein the antibacterial materials include peptidomimetic antimicrobials comprising one or more of (KLAKLAK)2, D-(KLAKLAK)2, brilacidin (PMX-30063), or POL7080.

* * * * *